United States Patent Office 3,095,862
Patented July 2, 1963

3,095,862
SCALE REMOVAL
Roland A. Berner, Tinley Park, Ill., assignor to Nalco Chemical Company, Chicago, Ill., a corporation of Delaware
No Drawing. Filed Mar. 21, 1960, Ser. No. 16,143
4 Claims. (Cl. 122—379)

The present invention is concerned with a method of removing scale, particularly carbonate scale, from heat transfer surfaces. It is especially concerned with the chemical cleaning of boilers.

Because of mechanical conditions, unusual operations, poor control, ineffective or carelessly operated treating equipment or inexperienced personnel, regular water treatment is not always completely effective in preventing scale formation on heat transfer surfaces. It is necessary to remove this scale periodically to maintain operating efficiency and/or prevent failure.

The chief objections to scale may be stated briefly as follows:

(1) The insulating properties of the scale tend to reduce efficiency.

(2) The equipment must be out of service during scale removal operations.

(3) Frequent scale removal operations result in additional maintenance costs.

(4) In some instances equipment is damaged due to scale removal operations.

At the present time inhibited hydrochloric acid is the most common chemical means for removing scale. From the viewpoint of the average plant operator the method has one or more of the following disadvantages:

(1) It is expensive when done by outside service companies.

(2) It involves considerable hazard to men and equipment when undertaken by inexperienced personnel.

(3) Repeated acid cleaning results in metal damage.

(4) Considerable outage time is required for cleaning.

The most common deposits encountered are the carbonates, sulfates, silicates, phosphates and iron oxides. Carbonate scales are normally susceptible to acid cleaning and are encountered in boilers operating at below 500 p.s.i. (pounds per square inch). They most frequently occur in boilers operating below 300 p.s.i. It is usually the case, however, that sulfate and silicate scales are accompanied by a carbonate constituent. In this instance the acid attacks the carbonate and in so doing loosens the other components rendering them easily removable.

There has long been a need for a formulation that would remove scale from a boiler without the inconveniences set forth above. It is therefore an object of the invention to furnish a new and useful chemical and chemical treatment for the removal of scale, particularly carbonate scale, from heat transfer surfaces, with superior efficiency.

Another object is to provide a chemical and chemical treatment for carbonate scale that is relatively safe to use.

A further object is to provide a relatively non-corrosive chemical for use in cleaning carbonate scales from low pressure boilers.

Still a further object is to allow boilers to continue normal operations while chemical scale cleaning and removing compositions are dissolved in the boiler water and are acting upon said scale. Other objects will appear hereinafter.

In accordance with the invention, it has been found that carbonate scale may be effectively loosened and removed from the heat transfer surfaces of boilers, as well as the hot liquid contacting surfaces of pipelines, feed water heaters, sterilizers, washing machines and the like, by contacting said scale with a preparation which includes as essential ingredients, an aqueous solution of an alkali metal salt of a hydroxy substituted carboxylic acid together with a sludge conditioning agent. In a preferred embodiment a polyoxyalkylene glycol, antifoam agent is used in combination with the above recited ingredients, to considerable advantage.

In the preparation of formulations for use in treating heat transfer surfaces it is desirable to keep the weight ratio of salt to sludge conditioning agent within the ranges of 2:1 to 1:2 with the most useful range for the chemical cleaning of carbonate scale from boilers being at about 1:1.

The alkali metal salts of hydroxy substituted carboxylic acids are derived from those acids which are soluble in water at 20° C., as their calcium salts, to the extent of at least 500 parts per million and which have a dissociation constant ($K_1$) of from $2\times10^{-3}$ to $1\times10^{-5}$. Examples of such acids are malic, malonic, tartaric, citric, gluconic, lactic and salicylic. While the alkali metal salts of the above descirbed acids give good results when used in the practices of the invention, those which have given outstanding results are the alkali metal citrates, particularly sodium citrate.

The expression "alkali metal" is intended to include ammonium. The ammonium salts would not be used where the possibility of undesirable ammonia formation was present.

The alkali metal salts above described as placed in combination with a sludge conditioner with or without an antifoam, in the above recited proportions with respect to each other, are employed to remove scale from heat transfer surfaces by dissolving at least 0.05 to 2% and preferably 0.1 to 1.0 by weight of the total composition in water, and contacting the scale with the water containing the dissolved additives, for a sufficient period of time to cause the scale to become loosened and easily removable. The process is usually conducted under the normal operating conditions of the particular piece of equipment to be cleaned. This is meant, where a boiler is being cleaned, to include boiler pressures up to 500 p.s.i. (gauge). A preferred ratio of salt to sludge conditioning agent is 1:1. In most instances the boiling of the dilute treating solutions while the system treated is under super-atmospheric pressure, is advantageous since it enables the treatment to thoroughly contact and operate upon remote and inaccessible portions of the system which is scaled.

When polyoxyalkylene glycol antifoaming agents are used in addition to the above recited salt as combined with sludge conditioners, it is desirable to maintain a weight ratio between the sludge conditioner and antifoam agent of from 300:1 to 2:1 with a preferred ratio being 45:1. Of course, the ratios between the salt and sludge conditioning agent are adjusted when the polyoxyalkylene glycol antifoaming agent is used in substantial amounts.

A variety of well known materials known to the art as "sludge conditioning agents" may be used in the combination of materials which are used in connection with the newly invented method. It should be understood that the term "sludge conditioning agent" is used only for want of a better expression to define the following described materials which have long been known in the art to have utility along lines suggested by the said term, and have thus been described in technical literature by use of this term. The expression is not intended necessarily to define the mechanism of the action of materials to which it is applied, as being that of sludge conditioning in this newly invented system. The activity of the conditioners as combined with salts is not fully understood, except that their combined action is directed at the formed scales or deposits and not the sludge.

The following theory is proposed for the action of the combined materials.

In a successful scale removing boiler cleaner of the type invented in this instance, it is believed to be desirable to include materials which will penetrate into the interstices between the calcium carbonate crystals of which the scale is composed, and thereby weaken the physical and/or electrical bonds which maintain the crystals in a continuous coherent relationship. When these bonds are weakened, the scale is broken up by other forces existing in an operating boiler such as the scouring action of boiling liquid. It is further desirable to include in a boiler cleaning compound, a material or materials which have in addition to scale penetrating power, a stronger affinity for the boiler metal than for the scale forming crystal surfaces. This results in an effective stripping of the scale from the metal surfaces, after it has first been penetrated by the compound. The affinity for metal, of the boiler cleaner compound, causes it to interpose itself between scale and the boiler metal. The above described boiler water additive materials of this invention are believed to constitute a cleaner which acts in accordance with the outlined theory.

It has been noticed that neither the salt component nor the sludge conditioning component of the compositions used in the inventive method, are as effective as might be desired when used by themselves apart from each other. They are, however, remarkably effective and serve as efficient carbonate scale removers when placed in a boiler water in combination with each other in the appropriate proportions specified in this application.

An illuminating discussion of organic additives for boiler water which are described as "sludge conditioning agents," may be found among the Proceedings of the 1951 Power Conference, in an article by J. A. Holmes, entitled "The Development of Organics for Water Treatment." Such compositions include chestnut and quebracho tannins and various derivatives of the tannins such as pyrogallol, catechol, resorcinol and hydroquinone. Further sludge conditioners may be found among various lignin derivative compounds, for example those obtained from waste sulphite liquors obtained incident to the manufacture of paper. Commonly available compounds which are able to be obtained or derived from such sources, include sodium ligno-sulfonate as well as lignin derivative compounds in which the sulfonate has been removed, or in which the methoxy groups have been demethylated by hydrolysis processes, which produce hydroxyl groups by utilizing controlled heating under pressure. The latter materials have a catechol-like structure of large molecular dimensions and are sometimes thought of as having properties similar to polymers of catechol or gallol. Typical reactions as they are believed to occur in the desulfonation and demethylation of lignin derivatives are illustrated as follows:

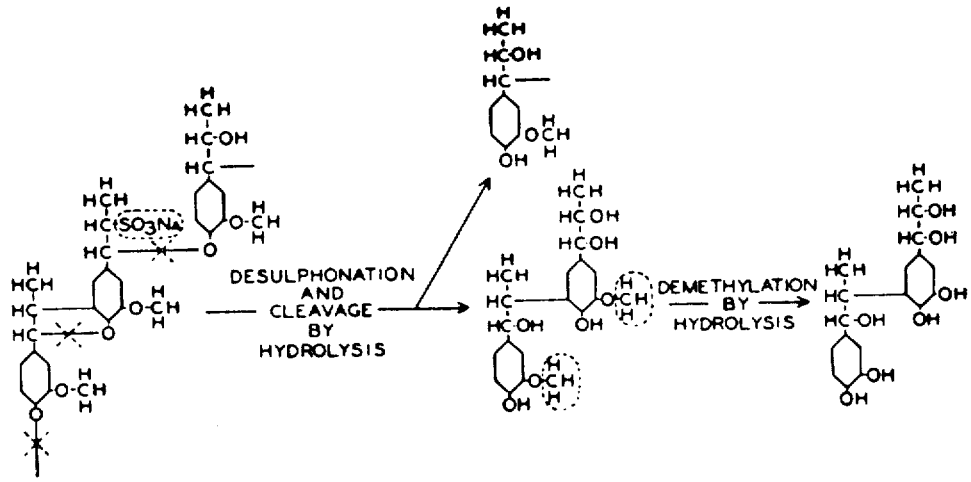

Still further sludge conditioners may be found among the starches obtained from potatoes, corn and rice as well as wheat. Other useful plant derivatives include glucosates and alginates. Valuable alginitic seaweed derivatives include sodium mannuronate, agar-agar, and sodium alginate. Preferred organic "sludge conditioners" are tannins, lignins, and derivatives thereof. Particularly useful materials are derived from lignin. Illustrative lignin derivatives may be found in the Bird patent, U.S. Patent No. 2,505,457, the disclosure of which is incorporated herein by reference, e.g., a lignin soluble in alkaline aqueous solutions at a pH of 10.5 and resulting from the alkaline hydrolysis of sodium lignosulfonate with caustic alkali at temperatures within the range of 265° C. to 325° C. for a period of 30 to 120 minutes under superatmospheric pressures. An illustrative composition under this patent is a water soluble demethylated lignin soluble in alkaline solutions at a pH of 10.5 resulting from the alkaline hydrolysis of an aqueous mixture containing by weight 250 to 350 grams per liter of sodium lignosulfonate substantially free from calcium and magnesium ions and derived from waste sulfite liquor, hydrolyzed with 50 to 100 grams per liter of caustic soda at a temperature of about 285° C. and a pressure of 1500 p.s.i. for 30 minutes, followed by partial neutralization of the excess caustic soda. Lignin compounds and their derivatives are particularly interesting since certain members of this class of chemicals have been found to be stable to temperatures of 650° F., which corresponds to a steam pressure of approximately 2200 p.s.i.

The polyoxyalkylene glycol antifoam agents capable of use in the invention may also be said to be polyether compounds which come within the classification consisting of polyoxyalkylene polyols having a terminal hydroxyl group attached to a terminal carbon atom at opposite ends of a polyoxyalkylene linear chain, their aliphatic monoethers wherein one of said terminal hydroxyl groups is replaced by an ether group, their aliphatic diethers wherein two of said terminal hydroxyl groups are replaced by other groups and aliphatic mono- and diamine condensation products wherein a hydrogen atom of a primary or secondary amine is reacted with one or two of said terminal hydroxyl groups with the elimination of water and which are characterized by polyoxyalkylene chains containing all oxyethylene groups or both oxyethylene and oxypropylene groups, or all oxypropylene groups, and have an average molecular weight such that the portion thereof attributable to oxyalkylene groups is at least 1000, with the further proviso that the said compound is substantially insoluble in water under the conditions of use. Where the compounds employed for the purpose of the invention contain both oxyethylene and oxypropylene groups in random distribution they are referred to herein as "heteric" compounds. The average molecular weights of the invention are within the range of 1000 to 10,000. The best results have been obtained with polyoxyalkylene polyols having a weight ratio of oxyethylene groups to oxypropylene groups in the range of about 1:22 to about 3:1 and an average molecular weight of about 2000 to 7000.

Heteric polyoxyalkylene diols which are suitable for the practice of the invention are described in Toussaint et al., U.S. Patent 2,425,845. Monoethers of heteric polyoxyalkylene diols which are suitable for the purpose of the invention are described in Roberts et al., U.S. Patent 2,445,755. Diethers of heteric polyoxyalkylene diols suitable for the purpose of the invention are described in Roberts et al., U.S. Patent 2,520,611. Aliphatic amine derivatives of polyoxyalkylene diols suitable for the practice of the invention are obtained by reacting ethylene oxide or both ethylene oxide and 1,2-propylene oxide with primary and secondary amines.

The preparation of amine derivatives of alkylene oxides has been described by Horne and Shriner (J.S.C.S. 54, 2925 (1932)) who passed ethylene oxide into a mixture of diethylamine dissolved in methanol. Although the chief product of the reaction was diethylaminoethanol, the authors state that higher molecular weight compounds were also obtained. Headlee et al. (J.A.S.S. 55, 1066 (1933)) continued this work and found that the yield of polymeric material could be increased by using an autoclave and higher molar ratios of ethylene oxide to amine. Schwoegler, U.S. Patents 2,337,004 and 2,373,199, disclosed the preparation of amine derivatives by heating an aliphatic primary or secondary amine with an equivalent amount of anhydrous alkylene oxide or by using a high ratio of amine to oxide (15:1) at 1600 pounds per square inch. German Patent 667,744 discloses the heating of one mol of primary or secondary aliphatic amines with 12 mols of alkylene oxide in the presence of a small amount of caustic alkali.

Suitable compositions can also be prepared by starting with a high molecular weight polyoxypropylene glycol and adding thereto various amounts of ethylene oxide, for example, starting with polyoxypropylene glycol having a molecular weight of 1000, enough ethylene oxide can be added to produce a product having a molecular weight of 2000 to 7000. Similarly, starting with a polyoxypropylene glycol having a molecular weight of 1800, enough ethylene oxide can be added thereto to produce a product having a molecular weight of 2000 with a mol ratio of propylene oxide to ethylene oxide of 31:4.5. Alternatively, with a polyoxypropylene glycol having a molecular weight of 1800, enough ethylene oxide can be added to produce a product having a molecular weight of 3600 with a mol ratio of propylene oxide to ethylene oxide of approximately 31:41. Another alternative is to start with a polyoxypropylene glycol having a molecular weight of 1800 and add enough ethylene oxide to produce a final product having an average molecular weight of 7000 with a mol ratio of propylene oxide to ethylene oxide of 31:118. Another product which can be prepared for the practice of the invention is made by reacting polyoxypropylene glycol 1200 with ethylene oxide until the final molecular weight is between 2000 and 7000. Another composition suitable for the practice of the invention can be made by starting with polyoxypropylene glycol 2000 and adding 2 to 12 mols of ethylene oxide.

A product prepared from 35 mols of propylene oxide and 2 to 12 mols, preferably 4 mols of ethylene oxide has been found especially useful in the practice of the invention.

The use of the above described compounds as well as related compositions as boiler antifoams are described in the following U.S. patents: 2,575,298; 2,626,243; 2,575,276; 2,609,344; 2,701,239 and 2,727,867 the disclosures of which are incorporated by reference.

The following compositions are given to illustrate specifically the polyoxyalkylene glycol antifoam agents which can be employed satisfactorily in the formulation of compositions useful in the invention.

COMPOSITION I

A polyoxyalkylene glycol with an ethylene oxide to 1,2-propylene oxide ratio of 1:9 having a viscosity of 506 S.U.S. (Saybolt Universal Seconds) at 100° F. (Ucon 10 HDG–506, Carbide and Carbon Chemicals Corporation.)

COMPOSITION II

A polyoxyalkylene glycol with an ethylene oxide to 1,2-propylene oxide ratio of 1:3 having a viscosity of 510 S.U.S. at 100° F. (Ucon 25 HDG–510.)

COMPOSITION III

A polyoxyalkylene glycol with an ethylene oxide to 1,2-propylene oxide ratio of 1:3 having a viscosity of 2005 S.U.S. at 100° F. (Ucon 25 H–2005.)

COMPOSITION IV

A polyoxyalkylene glycol with an ethylene oxide to 1,2-propylene oxide ratio of 2:3 having a viscosity of 499 S.U.S. at 100° F. (Ucon 40 HDG–499.)

COMPOSITION V

A polyoxyalkylene glycol with an ethylene oxide to 1,2-propylene oxide ratio of 1:1 and one terminal dibutylamine group, having a viscosity of 588 S.U.S. at 100° F. (Ucon 50 HDBA–588.) This compound was prepared by reacting an equimolar mixture of ethylene oxide and 1,2-propylene oxide with dibutylamine.

COMPOSITION VI

The monobutyl ether of a polyoxyalkylene glycol having an ethylene oxide to 1,2-propylene oxide ratio of 1:1 and having a viscosity of 55 S.U.S. at 100° F. (Ucon 50 HB–55.)

COMPOSITION VII

The monotetradecyl ether of a polyoxyalkylene glycol having an ethylene oxide to 1,2-propylene oxide ratio of 1:1 and having a viscosity of 761 S.U.S. at 100° F. (Ucon 50 HTD–761.)

COMPOSITION VIII

The monoethyl ether of a polyoxyalkylene glycol having an ethylene oxide to 1,2-propylene oxide ratio of 1:1 and having a viscosity of 1277 S.U.S. at 100° F. (Ucon 50 RH–1277.)

COMPOSITION IX

A monobutylether of a polyoxyalkylene glycol having an ethylene oxide to 1,2-propylene oxide ratio of 1:1 and having a viscosity of 5100 S.U.S. at 100° F. (Ucon 50 HB–5100.)

COMPOSITION X

A polyoxyalkylene glycol with an ethylene oxide to 1,2-propylene oxide ratio of 1:9 having a viscosity of 373 S.U.S. at 100° F., and a molecular weight of approximately 1150. (Ucon 10 HDG–373.)

COMPOSITION XI

A polyoxyalkylene glycol with an ethylene oxide to 1,2-propylene oxide ratio of 1:9 having a viscosity of 373 S.U.S. at 100° F., and a molecular weight of approximately 1150. (Ucon 10 HDG–373.)

COMPOSITION XII

A polyoxyalkylene glycol with an ethylene oxide to 1,2-propylene oxide ratio of 1:9 having a viscosity of 700 S.U.S. at 100° F. and a molecular weight of approximately 2100. (Ucon 10 HDG–700.)

COMPOSITION XIII

A polyoxyalkylene glycol with an ethylene oxide to 1,2-propylene oxide ratio of 1:9 having a viscosity of 1682 S.U.S. at 100° F. and an approximate molecular weight of 3600. (Ucon 10 HDG–1682.)

COMPOSITION XIV

A polyoxyalkylene glycol with an ethylene oxide to 1,2-propylene oxide ratio of 1:3 having a viscosity of 876 S.U.S. at 100° F. and an approximate molecular weight of 2200. (Ucon 25 HDG–876.)

COMPOSITION XV

A polyoxyalkylene glycol with an ethylene oxide to 1,2-propylene oxide ratio of 1:3 having a viscosity of 1156 S.U.S. at 100° F. and an approximate molecular weight of 2600. (Ucon 25 HDG–1156.)

COMPOSITION XVI

A polyoxyalkylene glycol with an ethylene oxide to 1,2-propylene oxide ratio of 1:3 having a viscosity of 2157 S.U.S. at 100° F. and an approximate molecular weight of 4000. (Ucon 25 HDG–2157.)

COMPOSITION XVII

A polyoxyalkylene glycol with an ethylene oxide to 1,2-propylene oxide ratio of 2:3 having a viscosity of 755 S.U.S. at 100° F. and an approximate molecular weight of 1850. (Ucon 40 HDG–755.)

COMPOSITION XVIII

A polyoxyalkylene glycol with an ethylene oxide to 1,2-propylene oxide ratio of 2:3 having a viscosity of 1026 S.U.S. at 100° F. and an approximate molecular weight of 2250. Ucon 40 HDG–1026.)

COMPOSITION XIX

A polyoxyalkylene glycol with an ethylene oxide to 1,2-propylene oxide ratio of 2:3 having a viscosity of 1703 S.U.S. at 100° F. and an approximate molecular weight of 3100. (Ucon 40 HDG–1703.)

COMPOSITION XX

A polyoxyalkylene glycol with an ethylene oxide to 1,2-propylene oxide ratio of 2:3 having a viscosity of 2412 S.U.S. and an approximate molecular weight of 3800. (Ucon 40 HDG–2412.)

COMPOSITION XXI

The monobutylether of a polyoxyalkylene glycol having an ethylene oxide to 1,2-propylene oxide ratio of 3:2 and having a viscosity of 5100 S.U.S. at 100° F. (Ucon 60 HB–5100.)

COMPOSITION XXII

The monobutylether of a polyoxyalkylene glycol with an ethylene oxide to 1,2-propylene oxide ratio of 1:1 having a viscosity of 691 S.U.S. at 100° F. and an approximate molecular weight of 1600. (Ucon 50 HB–691.)

COMPOSITION XXIII

The monotetradecylether of a polyoxyalkylene glycol with an ethylene oxide to 1,2-propylene oxide ratio of 1:1 having a viscosity of 1294 S.U.S. at 100° F. and a molecular weight of approximately 2192. (Ucon 50 HTD–1294.)

COMPOSITION XXIV

A polyoxyalkylene glycol with an ethylene oxide to 1,2-propylene oxide ratio of 3:1 having a viscosity of 1400 S.U.S. at 100° F. (Ucon 75 H–1400.)

COMPOSITION XXV

A polyoxyalkylene glycol with an ethylene oxide to 1,2-propylene oxide ratio of 3:1 having a viscosity of approximately 63,000 S.U.S. at 100° F. (Ucon 75 H–63,000.)

COMPOSITION XXVI

A polyoxyalkylene glycol with a weight ratio of ethylene oxide to 1,2-propylene oxide of 3:1 having a viscosity of approximately 3000 S.U.S. at 100° F. and a molecular weight of approximately 7000. (Ucon 75 H–3000.)

COMPOSITION XXVII

A polyoxypropylene glycol of average approximate molecular weight of 1000.

COMPOSITION XXVIII

A polyoxypropylene glycol of average approximate molecular weight of 1200.

COMPOSITION XXIX

A polyoxypropylene glycol of average molecular weight of 2025.

COMPOSITION XXX

A polyoxypropylene glycol of average molecular weight of approximately 2700.

COMPOSITION XXXI

A monobutylether of a polyoxypropylene glycol having a viscosity of 385 S.U.S. at 100° F. (Ucon LB–385.)

COMPOSITION XXXII

A monobutylether of a polyoxypropylene glycol having a viscosity of 613 S.U.S. at 100° F. and having an average molecular weight of 1550. (Ucon LB–613X.)

COMPOSITION XXXIII

A monobutylether of a polyoxypropylene glycol having a viscosity of 1145 S.U.S. at 100° F. and an approximate molecular weight of 3300. (Ucon LB–1145.)

COMPOSITION XXXIV

A polyoxypropylene glycol having a viscosity of 135 S.U.S. at 100° F. (LB–135.)

COMPOSITION XXXV

In Compositions V and X the butylamine and dibutylamine employed in making the respective compositions can be replaced by other aliphatic amines, as, for example, ethylamine and diethylamine, propylamine and dipropylamine, amylamine, and diamylamine, and their higher homologues.

COMPOSITION XXXVI

The composition obtained by reacting 4 mols of ethylene oxide with a polyoxypropylene glycol derived from 35 mols of 1,2-propylene oxide.

COMPOSITION XXXVII

A composition obtained by reacting polyoxypropylene glycol 1800 with sufficient ethylene oxide to produce a composition having a molecular weight of about 2000.

COMPOSITION XXXVIII

A composition obtained by reacting polyoxypropylene glycol 1800 with sufficient ethylene oxide to produce a composition having a molecular weight of about 3600.

The polyoxyalkylene glycol, antifoaming agent while acting primarily to prevent foaming and priming during the cleaning process, offers two other advantages which are desirable. First, it acts upon oils and hydrocarbon liquids which are often tenaciously entrained in the scale causing release of this oil into the system where it can be removed easily. Secondly, it acts as an auxiliary dispersant and helps place the loosened scale in a more suspended and fluid form. Further it helps in penetrating the scale or deposit so that the combined materials with which it is used can act on the intersurfaces of the metal and scale or deposit.

From a standpoint of use as scale cleaners it is desirable to formulate the various ingredients into a unitary formulation, preferably a granular solid. Typical examples of general and specific types of such formulations are listed below:

COMPOSITION XXXIX

Ingredients: Percent by weight
1. Alkali-metal salt of a hydroxy substituted carboxylic acid _____ 25–75
2. Sludge conditioning agent _____ 25–75

COMPOSITION XL

Ingredients: Percent by weight
1. Alkali metal salt of a hydroxy substituted carboxylic acid _____ 25–75
2. Sludge containing agent _____ 20–60
3. Polyoxyalkylene glycol anti-foaming agent _____ 0.5–10

COMPOSITION XLI

Ingredients: Percent by weight
1. Sodium citrate _____ 50
2. Sulfonated lignin as per U.S. Patent 2,505,457 _____ 43.8
3. Composition III _____ 1
4. Soda ash _____ 5.2

The soda ash in Composition XLI provides desirable excess alkalinity to the formula and is an absorbent for the liquid antifoam agent, thus allowing a powdery, water dispersible formulation to be prepared.

Formulations as described above are used by placing them into the water to be treated to form solutions containing at least 0.05% by weight of such formulations and preferably from 0.1% to 1.0% by weight. The water is preferably maintained at a pH of from 10.5 to 11.5 during the operation.

There are basically two systems by which the above described materials may effectively be used to clean a boiler. In both systems, the boiler is first placed in normal operation, preferably under conditions of boiling at super-atmospheric temperatures. In one method, successive increments of the additive materials are then placed in the boiler at separated intervals of time in low dosage amounts. The successive additions are made preferably while the boiler is operating under full load, at pressures of from 0 to 500 p.s.i. (gauge). The dosages are scheduled to maintain a concentration of additive material of from 0.1 to 1.0% by weight of total additive. Normal operation of the boiler being treated is continued in customary fashion. In this manner, simultaneously with "on the line" operation, carbonate scale is loosened and dispersed. Finally, at the end of the run, the boiler water is blown down until all the freed scale has been removed from the system. For the treatment to be effective against carbonate scales in boilers, it must usually be in contact with these scales for at least 4 hours and the process may continue for as long as 48 hours but the average carbonate scale removal problem can be solved in from about 8 to 16 hours. These time limits are based on the use of a 2% by weight solution of the treating composition in the water employed in the treatment and may vary depending on the circumstances of a particular cleaning operation.

An alternative system, which is of particular utility in instances of the treatment of a heavily scaled boiler system, is one wherein prior to the addition of the newly invented additives to the boiler water, the operating pressure (where a gauge pressure exists) is reduced to about one-half the normal full load to pressures ranging from 0 to 250 pounds per square inch (gauge), and the additives are fed in a single dose. Reduction in pressure is preferably scheduled near the end of a normal operating run, and the single dose added at that time is scheduled to produce a relatively high additive concentration as compared with the concentration which is maintained in the multiple dose system just previously described. Preferred dosages used in the single dose method are such as will be sufficient to result in concentrations of 1.0 to 2.0% by weight of the total additive materials.

The processes above described are designed to operate without the necessity of first shutting down the equipment prior to clean up. In some instances the treatment will be used just before scheduled shutdowns so that any residual scale deposits may be removed before equipment inspection. In instances where it is desired to use the treatment intermittently throughout the normal operational cycle of a boiler, this can be done by making the necessary continuous or semicontinuous feeding arrangements such as are used for regularly supplying water treatment chemicals to boiler waters.

The advantages of the treatments and systems herein outlined are many when it is understood that prior art mineral acid boiler cleaning required most of the following steps:
(1) Take the boiler down.
(2) If boiler water is high in organic, treat with caustic.
(3) Add the acid to the boiler water.
(4) Neutralize the acid after it had acted on the scale.
(5) Drain the boiler water.
(6) Return the boiler to operation.

Evaluation of the Invention

The following tests show the several advantages of the invention:

EXAMPLE I

*Experimental procedure.*—The experimental boiler used was of the type described in the paper, Experimental Studies of Iron Oxide Deposits in Boilers, by C. Jacklin and H. Thompson, Proceedings of the 1950 Midwest Power Conference.

Before each investigated cleaning material was tested, the experimental boiler was operated for 12 hours at a pressure of 250 p.s.i., with the feedwater containing sufficient scale forming chemicals to build up a calcium carbonate scale deposit on the tube. The scaled tube was then removed, the scale identified, and the thickness of the deposit measured. The tube was then reinserted in the boiler along with a weighed corrosion test specimen.

The investigated cleaner used at the rate of 2% by weight of the boiler water, was dissolved in deionized water. The pH of the solution was determined, and solubility chraracteristics of the cleaner noted. The cleaning solution was then pumped into the boiler. The boiler was operated for 4 hours at 250 p.s.i. for each cleaning test without blowdown. Chicago tap water was used for feedwater makeup. Any deviations from the above are noted in the list of tests.

*Procedure for obtaining corrosion evaluation.*—The specimen was of SAE 1010 steel, 1 inch by 2 inches, SAE gauge. It was sandblasted, cleaned, dried, and weighed. After the four hour test in the boiler filled with a solution of a proposed cleaning formulation the specimen was removed, rinsed and cleaned. To clean the specimen it was immersed for 30 seconds in inhibited HCl, then dipped in $Na_2CO_3$ solution several times, rinsed, dipped in acetone, dried in the oven and weighed. The weight loss of the specimen due to cleaning was taken into account in calculating the loss due to corrosion by the test solution.

*Corrosion calculations.*—Since some copper was present in the test equipment and in contact with the cleaning solution, the test specimens were examined by means of a microscope for evidence of copper deposit due to copper corrosion, and also checked by a spot test with 10% silver nitrate solution.

To permit a comparison of the corrosivity of proposed formulations with inhibited hydrochloric acid, a 5% solution of inhibited hydrocholric acid was held in the boiler at a temperature of 140° F. for 4 hours. The weight loss of the specimen at the end of the four hour test was 0.0890 gram. This is equivalent to 0.04 pound per square feet per day.

*Summary of Results*

The following were found to be least corrosive to the boiler:

TABLE I.—CORROSION

| Test No. | Conc., percent | Treatment | pH | Corrosion, Mils/year | Remarks |
| --- | --- | --- | --- | --- | --- |
| I | 2 | Composition XLI. | 10.05 | 26.4 | No carry over. Good $CaCO_3$ removal. |
| II | 5 | Inhibited Hydrochloric Acid. | 9.40 | 379 | |
| III | 1 | Citric Acid | 1.35 | 642 | Good scale removal. |
| IV | 1 | Glycolic Acid | 2.3 | 1,220 | Do. |

EXAMPLE II

This test was conducted on two Scotch Marine boilers located aboard a steamship. Inspection of the starboard boiler showed a carbonate scale deposit approximately ½ inch thick around the ends of the stay bolts, rivets and on top of the fire drum. The water volume of the boiler was about 3000 gallons. Five hundred pounds of Composition XLI were placed in the boiler, hot water added and the boilers put on bank. After steam was up, the boiler was operated at 150 p.s.i. for 4 hours. The boiler was cooled and the scale flushed out by alternately blowing down and allowing the water to rise to the normal level. Diluted treatment remained in the boiler overnight. The next morning the water was drained and the boiler was then examined. Scale removal was estimated to be at 75%. The treatment has penetrated under the scale since it was sloughed off in large pieces. There was no evidence of carryover throughout the cleaning period.

The expression "blow down," as used herein, refers to the removal of solids dissolved or suspended in water by any means whatsoever.

The expression "normal operation" refers to the operation of steam or heat generating equipment at atmospheric and superatmospheric conditions and temperatures. These pressures will usually be under 500 p.s.i.

The expression "carbonate scale" refers to scales containing at least 30% by weight of calcium and/or magnesium carbonate. They may contain other components.

The word "scale" unless otherwise specified includes all types of deposits normally found on heat transfer surfaces which contact deposit forming waters.

The phrase "sludge conditioning agent" is meant to include a large number of well known organic chemicals often used in boiler water chemistry and is not necessarily intended as an expression of the function of these compounds when used in the invention.

The phrase is intended to define organic additives which taken by themselves, ordinarily are used either to place sludge in a fluffy, flocculent, non adherent form or, where minimal quantities of the sludge exist, to disperse it.

The phrase "polyoxyalkylene glycol antifoaming agent" is a generic expression and is not intended as a functional limitation.

The word "boiling" as used herein means the application of heat to increase the temperature of the cleaning solutions of the types described.

This application is a continuation-in-part of our copending application, Serial No. 609,344 filed September 12, 1956 for Scale Removal, and now abandoned.

The invention is hereby claimed as follows:

1. The method of removing carbonate scale from a boiler when said boiler is operating which consists essentially of the steps:
    (a) Adding to water in a boiler from 0.05 to 2.0% by weight of a composition comprising an alkali metal salt of a hydroxy substituted carboxylic acid, selected from the group consisting of malic, malonic, tartaric, citric, gluconic, lactic, and salicylic acids, the calcium salt of said acid being soluble in water at 20° C. to the extent of at least 500 parts per million, and said acid having a dissociation constant of from $2 \times 10^{-3}$ to $1 \times 10^{-5}$, and an organic sludge conditioning agent of large molecular dimensions with the weight ratio of salt to sludge conditioner being within the range of 2:1 to 1:2;
    (b) Continuing normal operation of said boiler until the carbonate scale has loosened and dispersed and;
    (c) Blowing down said boiler.

2. The method of claim 1 wherein the alkali metal salt of a hydroxy substituted carboxylic acid is sodium citrate and the materials added to the boiler water are fed thereto in successive increments at intervals of from 15 minutes to 48 hours in such amounts as to maintain a concentration of said added material of from 0.1% to 1.0% by weight, said successive additions being made while said boiler is operating under load at a pressure of from 0 to 500 pounds per square inch (gauge).

3. The method of removing carbonate scale from a boiler when said boiler is operating which consists essentially of the steps:
    (a) Adding to water in a boiler from 0.05% to 2.0% by weight of a composition comprising an alkali metal salt of a hydroxy substituted carboxylic acid, selected from the group consisting of malic, malonic, tartaric, citric, gluconic, lactic, and salicylic, the calcium salt of said acid being soluble in water at 20° C. to the extent of at least 500 parts per million, and said acid having a dissociation constant of from $2 \times 10^{-3}$, to $1 \times 10^{-5}$, an organic sludge conditioning agent of large molecular dimensions and a polyoxyalkylene glycol having an average molecular weight of at least 1,000 with the weight ratio of the salt to the sludge conditioner being within the range of 2:1 to 1:2 and with the weight ratio of the sludge conditioner to said glycol compound being within the range of 300:1 to 2:1;
    (b) Continuing normal operation of said boiler until the carbonate scale has been loosened and dispersed and;
    (c) Blowing down said boiler.

4. The method of claim 3 wherein the alkali metal salt of the hydroxy substituted carboxylic acid is sodium citrate and the materials added to the boiler water are fed thereto in successive increments at intervals of from 15 minutes to 48 hours in such amounts as to maintain a concentration of said added material of from 0.1% to 1.0% by weight, said successive additions being made while said boiler is operating under full load at a pressure of from 0 to 500 pounds per square inch (gauge).

References Cited in the file of this patent

UNITED STATES PATENTS

| | | |
|---|---|---|
| 1,617,350 | Schenitza | Feb. 15, 1927 |
| 2,584,017 | Dvorkovitz | Jan. 29, 1952 |
| 2,723,956 | Johnson | Nov. 15, 1955 |
| 2,992,997 | Arden et al. | July 18, 1961 |

FOREIGN PATENTS 721,924   Great Britain _____ Jan. 12, 1955

OTHER REFERENCES

APC Application of Kovacs, 390,848, published May 11, 1943.

Combustion Engineering, First edition, seventh impression, published by Combustion Engineers, Superheater, Inc., 200 Madison Avenue, New York 16, New York, 1951, pages 21–11 through 21–13, Call No. TJ285D4C.4.

UNITED STATES PATENT OFFICE

CERTIFICATE OF CORRECTION

Patent No. 3,095,862                                   July 2, 1963

Roland A. Berner

It is hereby certified that error appears in the above numbered patent requiring correction and that the said Letters Patent should read as corrected below.

Column 2, line 31, for "descirbed" read -- described --; line 44, for "0,05" read -- 0.05 --; column 5, line 25, before "invention" insert -- preferred compounds employed for the purpose of the --; column 6, line 32, for "Saybolt" read -- Sayboldt --; column 7, line 54, before "Ucon" insert an opening parenthesis; column 10, line 66, for "chraacteristics" read -- characteristics --.

Signed and sealed this 14th day of January 1964.

(SEAL)
Attest:
ERNEST W. SWIDER

Attesting Officer

EDWIN L. REYNOLDS

Acting Commissioner of Patents